US005845071A

United States Patent [19]

Patrick et al.

[11] Patent Number: 5,845,071

[45] Date of Patent: Dec. 1, 1998

[54] ERROR CONTAINMENT CLUSTER OF NODES

[75] Inventors: David M. Patrick; Alan D. Gant; David M. Chastain, all of Plano, Tex.

[73] Assignee: Hewlett-Packard Co., Palo Alto, Calif.

[21] Appl. No.: 720,368

[22] Filed: Sep. 27, 1996

[51] Int. Cl.$^6$ .............................. G06F 12/14; G06F 13/16

[52] U.S. Cl. ...................... 395/200.45; 711/153; 711/152

[58] Field of Search ......................... 395/220.57, 210.61, 395/182.02, 200.45, 200.54; 365/205, 184.09, 203, 222, 185.02; 384/DIG. 1, DIG. 2; 711/152, 153, 173

[56] References Cited

U.S. PATENT DOCUMENTS

| | | | |
|---|---|---|---|
| 4,964,035 | 10/1990 | Aoyama et al. | 304/200 |
| 5,315,549 | 5/1994 | Scherpenberg et al. | 365/189.09 |
| 5,384,749 | 1/1995 | Lisart et al. | 365/230.01 |
| 5,394,554 | 2/1995 | Elko et al. | 395/200.4 |

OTHER PUBLICATIONS

IEEE Standard for Scalable Coherent Interface (SCI), IEEE Std. 1596–1992 ISBN 1–55937–222–2; pp. 1–40, 199–235.

John Chapin, Mendel Rosenblum, Scott Devine, Tirthankar Lahiri, Dan Teodosiu, and Anoop Gupta; "Hive: Fault Containment for Shared–Memory Multiprocessors"; this work first appeared in the 15th ACM Symposium on Operating Systems Principles, Dec., 1995.

*Primary Examiner*—Daniel H. Pan

[57] ABSTRACT

The multi-node multiprocessor system with globally shared memory is partitioned into groups of nodes called error containment clusters of nodes or ECCNs. The nodes would be partitioned such that an ECCN resides on a column of nodes or a row of nodes. Within each ECCN there is coherent memory sharing. Between the ECCNs, the communication is through a messaging protocol. The memory within each node is also partitioned into protected and unprotected memory. Unprotected memory is used for messaging and protected memory is used for sharing. A failure in an error containment cluster would corrupt the memory within that cluster, specifically the protected memory within that cluster and also the unprotected memory used by that cluster to communicate with the other clusters. However, the other clusters could continue to run because their protected memory would be unaffected, and could continue to communicate through the remaining unprotected memory.

14 Claims, 3 Drawing Sheets

ERROR CONTAINMENT CLUSTER OF NODES

RELATED APPLICATIONS

This application is related to U.S. patent application Ser. No. 08/720,330, entitled METHOD AND SYSTEM FOR MAINTAINING STRONG ORDERING IN A COHERENT MEMORY SYSTEM; U.S. patent application Ser. No. 08/720,331, entitled ROUTING METHODS FOR A MULTINODE SCI COMPUTER SYSTEM; and U.S. patent application Ser. No. 08/720,332, entitled TIME OF CENTURY COUNTER SYNCHRONIZATION USING A SCI INTERCONNECT; all filed concurrently with this application, and hereby incorporated by reference herein. These applications are commonly assigned.

TECHNICAL FIELD OF THE INVENTION

This invention relates in general to multinode, multiprocessor computer systems and in particular to a node arrangement for minimizing the effects of errors.

BACKGROUND OF THE INVENTION

A parallel system uses a globally shared memory environment so that any process running on any processor in the system has access to any memory anywhere in the whole system complex through normal cache coherency mechanisms. This system provides excellent performance and ease of programming, but there are significant disadvantages related to system availability or uptime.

The main problem is that error containment in a system using shared memory is difficult. All of the processors are tightly interconnected via the shared memory. This allows memory data to be transferred to/from and encached in any processor in the system. If there is a failure in one component of the system, the distribution of data makes it difficult to localize the failure, and the failure takes down the entire system. This is because, if there is a failure on any one processor, it may contain the only valid copy of specific data in its cache. Since all the processors can encache data from shared memory, there is no way to know what data has been corrupted by this failure. Thus, the only choice is to take the system down and then re-boot it. That is an undesirable aspect for availability. Therefore, it is really impossible to contain the error in this scenario.

The solution to this problem is to not have the processors directly share memory, but to communicate over a network. This approach is to network between the processors. This will contain the error to a single processor. Communication between the processors is accomplished through a network or messaging protocol. The network or messaging protocol reduces the performance, but allows an increase in system survivability. Basically, this arrangement is like interconnecting work stations together. If one workstation goes down, the system will still be able to run with the other workstations.

However, the disadvantage of this networking approach is that the processors are not able to share memory. The processors have to communicate through a network. There is a large performance cost for using a network protocol. This also increases the difficulty in writing software programs for the network environment that will utilize all its resources.

A prior art solution to the dilemma presented above was to use the workstation or networking approach, coupled with a software program to try to mimic globally shared memory system. This created an environment for the programmer that made it appear as if all the memory in the system were shared, but layers of software would actually be doing the networking and messaging protocol.

A problem with this solution is that it requires an overhead of layered software, which results in a performance cost. However, this approach has the advantage of increased availability for the system.

Therefore, there is need in the art for a system and method to utilize the shared memory system with all of its advantages and yet provide a higher system availability.

SUMMARY OF THE INVENTION

The above, and other needs, are met by arrangement of a multi-node system with globally shared memory that is to be partitioned into groups of nodes. These groups are called error containment clusters of nodes or ECCNs. Within each group there would be coherent memory sharing. Between the groups, the communication would be through a messaging protocol.

The memory within each node would also be partitioned into protected and unprotected memory. Unprotected memory is used for messaging and protected memory is used for sharing. Thus, if there is a failure in an error containment cluster, it would corrupt the memory within that cluster, specifically the protected memory within that cluster and also the unprotected memory used by that cluster to communicate with the other clusters. However, the other clusters could continue to run because their protected memory would be unaffected, and could continue to communicate through the remaining unprotected memory.

The arrangement of nodes in the inventive system is a row and column arrangement, with X and Y rings. The nodes would be partitioned such that a cluster resides on a column of nodes or a row of nodes. This is required so that the communication between two nodes in a cluster, or ECCN, would be done on rings that are contained within that cluster. This prevents the shared memory or protected memory communications between nodes within a cluster from having to go through a path in another cluster. If this occurs, then the failure of one cluster could take down another cluster.

A technical advantage of the present invention is to provide the advantages of both shared memory and messaging protocol, while minimizing the disadvantages of both approaches.

Another technical advantage of the present invention is to arrange processors into nodes, and then to group nodes into clusters, with the nodes within each group having coherent memory sharing, and using messaging protocol for the communications between groups.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The invention is an arrangement and method for a highly connected, multinode architecture that provides support for scalability. The multinode arrangement offers redundancy of processors, IO, and memory. The two dimensional interconnection provides multiple paths between any two nodes. These features allow error containment and provide a high level of system availability.

Figure 1A:
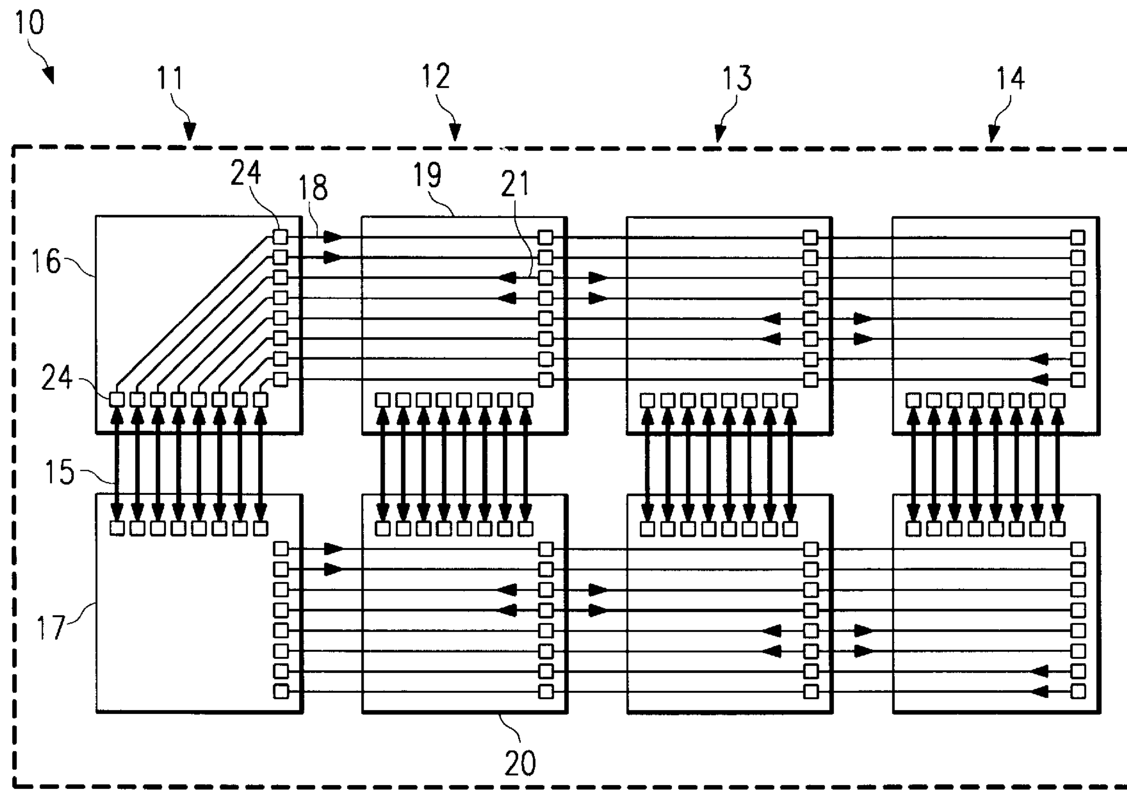
FIG. 1A depicts an inventive arrangement of a cluster of nodes before an error has occurred.

FIG. 1A depicts an example of the inventive node arrangement 10, specifically a 2×4 array of nodes that are grouped into four error containment cluster of nodes or ECCNs, 11, 12, 13, 14. Each ECCN comprises two nodes. The ECCNs are column oriented, meaning that the nodes that are connected by their Y-dimension rings to make up an ECCN. The ECCNs could be row oriented meaning that the nodes are connected by their X-dimension rings to make up an ECCN. The rings used to interconnect the nodes are SCI interface rings. These rings are defined in the IEEE Standard for Scalable Coherent Interface (SCI), IEEE Std. 1596-1992 ISBN 1-55937-222-2, which is incorporated herein by reference.

Each node of the ECCN can support up to sixteen processors. These processors are connected to processor agent chips or PACs. The function of the PACs is to transmit requests from the processors through a cross bar router chips (RACs) and to the memory access chips (MACs) and then forward the responses back to the requesting processor. The MACs control access to the coherent memory. When the processor generates a request to access memory or other resource, a PAC sends the request through a RAC to a MAC. If the request is destined for a memory on the local node, the MAC accesses the memory attached to it. If the request is destined for memory on another node, the MAC forwards the request to the TAC 24. A method for maintaining cache coherency is discussed in the co-pending application entitled "METHOD AND SYSTEM FOR MAINTAINING STRONG ORDERING IN A COHERENT MEMORY SYSTEM" filed on Sep. 27, 1996, Ser. No. 08/720,330, which is herein incorporated herein by reference.

The TAC chip 24 acts as an interface between the node and an SCI ring. The TAC 24 is also known as a toroidal access chip or a SCI controller. Each TAC 24 interfaces to two SCI rings, an X-dimension ring and a Y-dimension ring. In FIG. 1A, each TAC 24 is represented by two boxes, one for the X rings and one for the Y rings. The node 16 has connection lines showing how the two boxes are related to form a TAC. Each node can have up to eight TACs, and since each TAC is capable of operating a separate ring, there can be a total of up to 8 SCI rings connecting sections of nodes in a single dimension, i.e. 8 X-dimension rings and 8 Y-dimension rings. The TAC receives data requests from the node and places the request into the appropriate SCI ring. The processors, PACs, RACs, and MACs, are not shown in the figures. The individual components of each node, as well as a method and system for synchronizing the processors in a multi-processor system is discussed in the co-pending application entitled "TIME OF CENTURY COUNTER SYNCHRONIZATION USING A SCI INTERCONNECT" filed on Sep. 27, 1996, Ser. No. 08/720,332, which is incorporated herein by reference.

In the example of FIG. 1A, the vertical rings 15 or Y rings are used for the protected, coherent memory communication within the ECCN.

This ring is also known as interleaved lines, where the memory lines are sequentially dispersed across the memory modules/rings. Node 16 and node 17 are connected by the vertical rings 15, and they comprise ECCN 11. The nodes within the ECCN use all eight rings 15 for protected memory communication. The horizontal rings 18 or X rings are used for the messaging communication between the ECCNs. This rings are also known as non-interleaved lines. By software convention, the top two X rings 18 are going to be used by ECCN 11 to send messages to the other nodes in the other ECCNs, i.e. from ECCN 11 to ECCN 14. ECCN 12, comprised of nodes 19 and 20, are connected similarly to ECCN 11, but the nodes of ECCN 11 will use the next pair of X rings 21 to send their messages to the other ECCNs. ECCNs 13 and 14 are connected similarly.

FIG. 1A depicts a four cluster arrangement with each node using two X rings 18, in a two cluster arrangement, each node would use 4 X rings. In a three cluster arrangement, each node would use two rings for a total of 6 rings; the last two X-rings would not be used. In a seven cluster arrangement, each node would use one X ring with the last X ring not being used. However, all Y rings would be used in both the three and seven cluster arrangements.

Figure 1B:
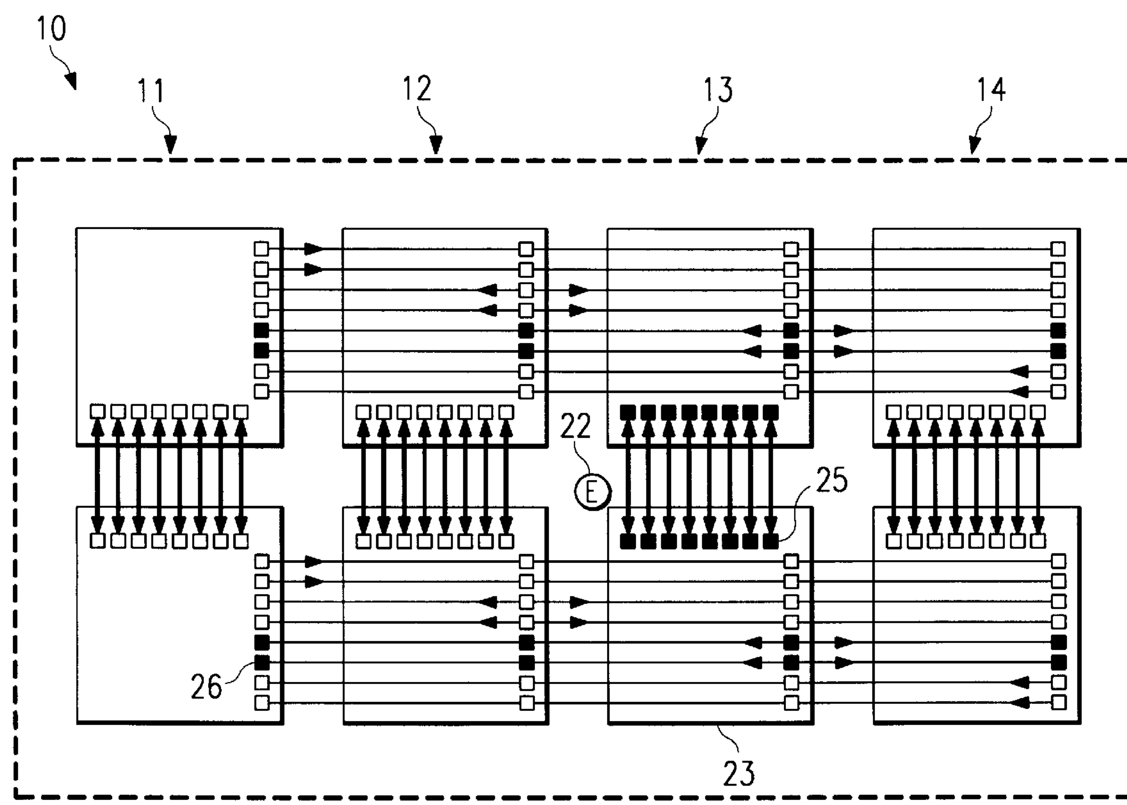
FIG. 1B depicts the arrangement of FIG. 1A after an error has occurred.

FIG. 1B depicts the arrangement of FIG. 1A, but with an error 22 occurring in the node 23 of ECCN 13. This error has corrupted the protected memory of ECCN 13. This is indicated in FIG. 1B by the shaded boxes 25 on the vertical rings. Moreover, this error could have occurred during a message transfer, and so any node that the ECCN could have been communicating with could have had its unprotected memory corrupted. This corrupted unprotected memory is shown as the shaded boxes 26 on the X rings. However, the other ECCNs 11, 12, and 14, can continue to operate and communicate with each other using the remaining, unshaded rings.

To correct this failure, the cables for that particular node 23 would be disconnected. The secondary routing registers would be enabled so that communication is no longer routed through that particular node 23, but rather is sent around that node. The protected memory communication within the other ECCNs would not be affected by correction, because they are already using the Y rings and so there is no need to have to change the way those rings are routed. This method is discussed in a co-pending applicant entitled "ROUTING METHODS FOR A MULTINODE COMPUTER SYSTEM", Ser. No. 08/720,331, filed on Sep. 27, 1996.

The type of failure described above corresponds to a failure that affects the messaging on the rings. This failure is a silent failure. It does not create any spurious traffic on the rings other than those rings that particular node uses for messaging. To compensate for a more catastrophic failure would require a different topology or connection of the X rings.

Figure 2A:
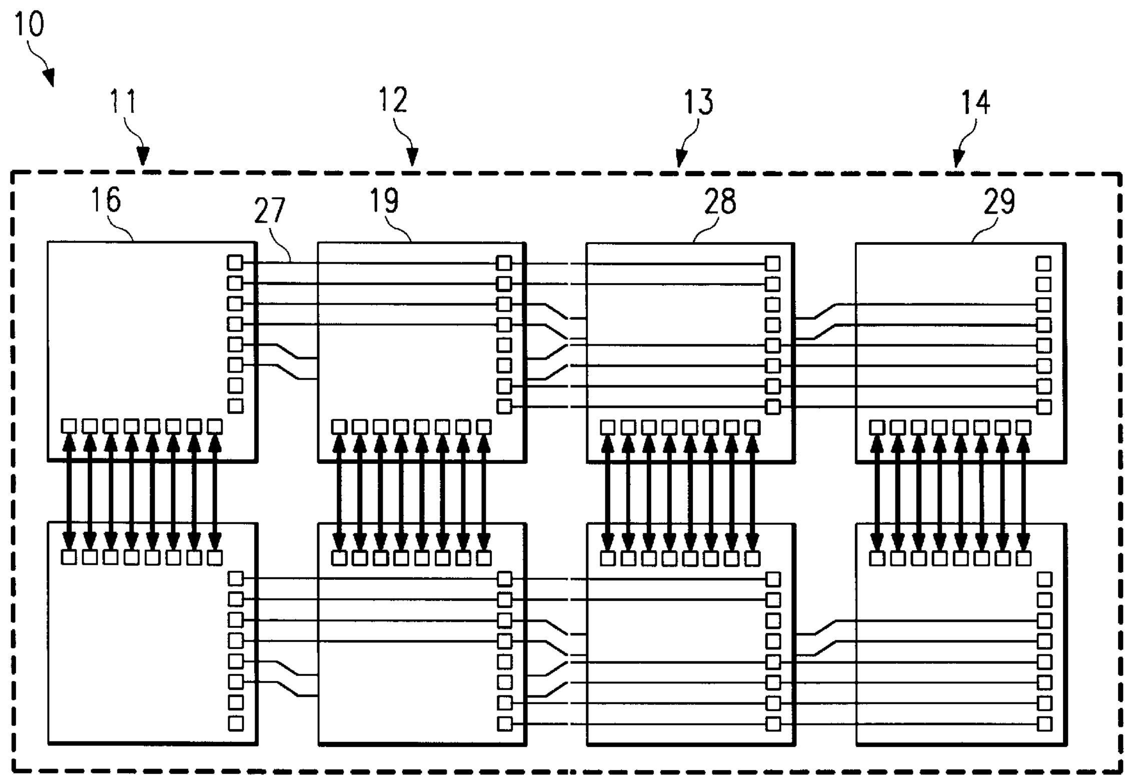
FIG. 2A depicts an inventive arrangement of a cluster of nodes with limited X ring interconnects before a catastrophic error has occurred.
Figure 2B:
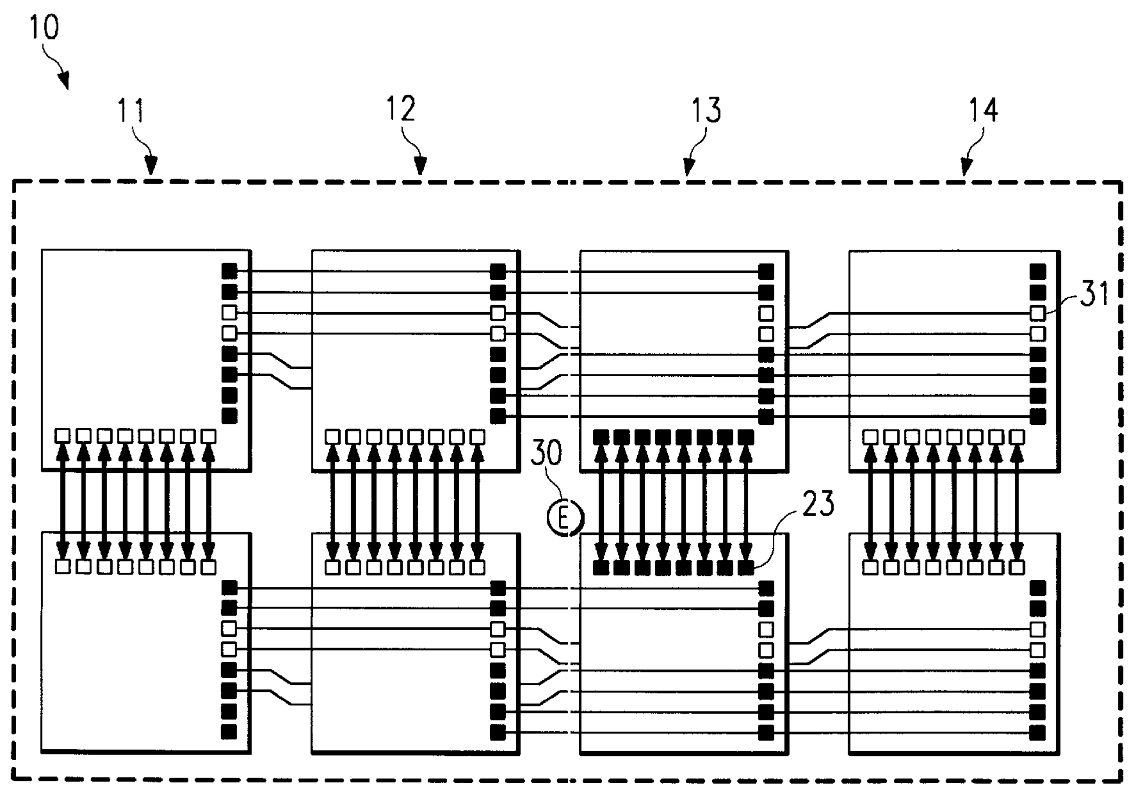
FIG. 2B depicts the arrangement of FIG. 2A after a catastrophic error has occurred.

FIG. 2A depicts another topology similar to that of FIG. 1A, in that the nodes are grouped into four ECCNs that are column oriented. However, the X rings that are used for messaging are connected in a staggered fashion so that a catastrophic failure of a node could not affect all of the unprotected memory in the system. This topology prevents a catastrophic failure where the failure on a node creates spurious traffic on all of the X rings, including those rings that the particular node does not use for messaging.

This topology has any one X ring connecting to only three nodes. For example, the X ring pair 27 is only connected to nodes 16, 19, and 28, but is not connected to node 29. This prevents a more catastrophic failure from corrupting all of the unprotected memory. In FIG. 1B, the same node 23 had failed, but in a more catastrophic way, so that the failure is generating spurious traffic on all of the connected messaging rings. This corrupts all of the unprotected memory in the other ECCNs except for the unprotected memory with which it has no connection, specifically the unshaded boxes 31. These are the two blocks of unprotected memory that could not have been corrupted by this failure. Therefore, the remaining ECCNs can use that memory for messaging communication.

A restriction on the system design is that the Y dimension in the multi-node configuration is limited to four nodes. This is because of a physical restriction in cabling. And the X dimension can be up to 7 nodes wide. Due to addressing requirements in the architecture, only 28 nodes can be supported, specifically a 4×7 can be supported, but not a 4×8 system. So the possible groupings of these ECCNs is limited by these restrictions.

The following table discloses the possible row oriented configurations for a 28 node system.

TABLE I

| # Nodes per ECCN | # ECCNS | Total # Nodes in a System |
|---|---|---|
| 1 | 2, 4, 6, 8 . . . 28 | 2, 4, 6, 8 . . . 28 |
| 2 | 2–4 | 4, 6, 8 |
| 3 | 2–4 | 6, 9, 12 |
| 4 | 2–4 | 8, 12, 16 |
| 5 | 2–4 | 10, 15, 20 |
| 6 | 2–4 | 12, 18, 24 |
| 7 | 2–4 | 14, 21, 28 |

The following table discloses the possible column oriented configurations for a 28 node system.

TABLE II

| # Nodes per ECCN | # ECCNS | Total # Nodes in a System |
|---|---|---|
| 1 | 2, 4, 6, 8 . . . 28 | 2, 4, 6, 8 . . . 28 |
| 2 | 2–7 | 4, 6, 8 . . . 14 |
| 3 | 2–7 | 6, 9, 12 . . . 21 |
| 4 | 2–7 | 8, 12, 16 . . . 28 |

The tables indicate that the system would support a configuration with each ECCN having one node, for a total of 28 ECCNs. However, this is essentially all software messaging without any shared memory, or the workstation approach discussed above.

Figure 3:
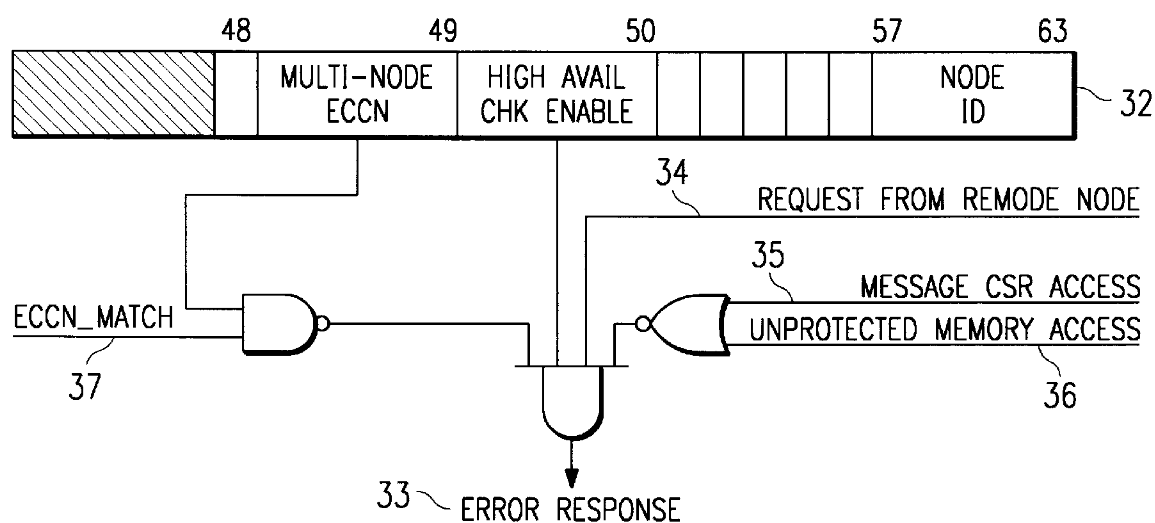
FIG. 3 depicts the MAC remote access checking logic.

Because only nodes within an ECCN are allowed to communicate through the protected memory, there needs to be a check that a node from another ECCN does not try and access the protected memory. FIG. 3 depicts the MAC remote access checking logic. The MAC system configuration register 32 holds information about the node ID and the local ECCN ID, as well as other system status and control bits.

The MAC or memory access control chip first determines if the access request 34 is to protected or unprotected memory. If the request 34 is to unprotected memory 36, then access is granted and no error signal 33 is sent. Access requests to certain messaging control status registers 35 or CSRs are allowed, and no error signal will be sent. However, if the request is neither a CSR access 35, nor an unprotected memory access 36, then the request is to protected memory or to a privileged CSR. If it is a request from a remote cluster 34 or ECCN, then an error response is sent 33. However, if it is a request from the local ECCN 37, the protected memory access request is granted. The ECCN match check 37 is performed by the TAC. The TAC compares the node ID fields of the requesting node with that of the local node. This comparison is used to determine if there is an ECCN match 37. Thus, this logic prevents a node from another ECCN from accessing protected memory.

Although the present invention and its advantages have been described in detail, it should be understood that various changes, substitutions and alterations can be made herein without departing from the spirit and scope of the invention as defined by the appended claims.

What is claimed is:

1. A method for containing errors in a multi-processor computer system having a plurality of nodes, each node having at least one processor and at least one memory device, the method comprising the steps of:

connecting the plurality of nodes into a topology having interconnected clusters thereof, the topology isolating first selected nodes from other selected nodes;

connecting second selected nodes from within the topology according to a staggered connection pattern so as to further isolate nodes from each other within the topology;

establishing regions of protected memory and unprotected memory within the clusters;

partitioning memory across clusters so that (1) a particular cluster's protected memory is write-accessible only by nodes within said particular cluster, and (2) said particular cluster's unprotected memory is write-accessible by nodes outside said particular cluster.

2. The method according to claim 1, in which the clusters are formed by connecting nodes into topologically independent rings thereof, and said interconnection of clusters is established by intersecting the rings at common nodes therein.

3. The method according to claim 2, in which the staggered connection pattern maintains the rings topologically isolated at selected common nodes.

4. The method according to claim 1, in which the topology is established in a Scalable Coherent Interface (SCI) environment.

5. The method according to claim 1, further comprising the step of: communicating between clusters by messaging.

6. A multi-processor computer system having a plurality of nodes each having at least one processor and at least one memory device, the system comprising:

the plurality of nodes connected into a topology having interconnected clusters thereof, the topology isolating first selected nodes from other selected nodes;

second selected nodes connected from within the topology according to a staggered connection pattern so as to further isolate nodes from each other within the topology;

means for establishing regions of protected memory and unprotected memory within the clusters; and means for partitioning memory across clusters so that (1) a particular cluster's protected memory is write-accessible only by nodes within said particular cluster, and (2) said particular cluster's unprotected memory is write-accessible by nodes outside said particular cluster.

7. The multi-processor computer system according to claim 6, in which communications among the nodes within a cluster is performed by sharing the memory devices of said nodes, and in which communications among the clusters is performed by messaging between clusters.

8. The multi-processor computer system according to claim 6, in which the clusters are formed by connecting nodes into topologically independent rings thereof, and said interconnection of clusters is established by intersecting the rings at common nodes therein.

9. The multi-processor computer system according to claim 8, in which the staggered connection pattern maintains the rings topologically isolated at selected common nodes.

10. The multi-processor computer system according to claim 8, in which rings in a row-oriented direction intersect with rings in a column-oriented direction.

11. The multi-processor computer system according to claim 10, in which nodes in row-oriented rings communicated by memory sharing, and in which nodes in column-oriented rings communicate by messaging.

12. The multi-processor computer system according to claim 8, in which the topology is established in a Scalable Coherent Interface (SCI) environment.

13. A method for containing errors in a multi-processor computer system having a plurality of nodes, each node having at least one processor and at least one memory device, the method comprising the steps of:

connecting the plurality of nodes into a topology having interconnected clusters thereof, the topology isolating first selected nodes from other selected nodes, the clusters formed by connecting nodes into topologically independent rings thereof, and said interconnection of clusters is established by intersecting the rings at common nodes therein, the topology further established in a Scalable Coherent Interface (SCI) environment;

connecting second selected nodes from within the topology according to a staggered connection pattern wherein rings are maintained topologically isolated at selected common nodes;

establishing regions of protected memory and unprotected memory within the clusters; and partitioning memory across clusters so that (1) a particular cluster's protected memory is write-accessible only by nodes within said particular cluster, and (2) said particular cluster's unprotected memory is write-accessible by nodes outside said particular cluster.

14. The method according to claim 13, further comprising the step of: communicating between clusters by messaging.

* * * * *